United States Patent Office 3,378,554
Patented Apr. 16, 1968

3,378,554
DICARBONYL-DIHYDRAZONES
Walter Püschel and Hans Schellenberger, Leverkusen, Germany; Karl Löffler, deceased, late of Leverkusen, Germany, by Monika Laux nee Löffler, heir, Berlin, Germany, Klaus-Richard Löffler and Claudia Maria Löffler, minor heirs, and Beate Elisabeth Löffler, heir and legal representative of minor heirs, Leverkusen, Germany; and Othmar Wahl, Leverkusen, and Willibald Pelz, Baden-Baden, Germany, assignors to Agfa Aktiengesellschaft, Leverkusen, Germany, a corporation of Germany
No Drawing. Continuation-in-part of application Ser. No. 858,052, Dec. 8, 1959. This application Apr. 6, 1965, Ser. No. 446,795
12 Claims. (Cl. 260—240)

The present invention is a continuation-in-part of application Ser. No. 858,052, filed Dec. 8, 1959, now U.S. Patent 3,186,840 issued June 1, 1965, and relates to a class of compounds as described herein below. In particular, this invention is particularly directed to compounds found useful in the color photographic art for the production of direct positive dyestuff images.

The dyes formed in a conventional color photographic process do not generally conform to theoretical standards. For example, magenta dyestuffs have an appreciable secondary absorption in the blue range, while cyan dyestuffs have secondary absorptions in the green and blue ranges.

The compounds of the present invention, however, have been found particularly useful in reacting with oxidation or development products of color developers to form substantially colorless coupling products. As such, they are very suitable for the production of colored direct positive images.

The present compounds are perhaps best described as a class of dicarbonyl dihydrazones having the formula $$R_1-C=N-NH-R_3$$
$$R_2-C=N-NH-R_4$$

which are fast to diffusion and contain at least one long chain aliphatic group such as an alkyl group of 6–20 carbon atoms, preferably 10–20 carbon atoms.

Of interest are compounds of the above formula in which $R_1$ and $R_2$ are defined individually as hydrogen, alkyl having up to 20 carbon atoms, phenyl, naphthyl, benzyl and a heterocyclic radical such as a furyl, thienyl, coumaronyl, thionaphthenyl, and pyridyl ring moieties.

$R_1$ and $R_2$ together with the connecting carbon atoms may be further defined as a 5–6 membered ring such as an isocyclic or heterocyclic moiety. Compounds of this type include a dihydrazone of cyclohexanedione. The heterocyclic moiety may further include benzofurane and indolyl groups as well.

$R_3$ and $R_4$ are defined individually as aromatic groups such as a phenyl and a naphthyl, also a 5–6 membered heterocyclic moiety such as a pyridyl, benzthiazolyl, thiazolyl, oxazolyl, benzimidazolyl, pyrazolyl and thienyl. Possible substituents on the aromatic groups include, for example, the corresponding sulfo, sulfonamido, carboxyl, carbamoyl, esterified carboxy, preferably esterified with aliphatic alcohols having up to 20 carbon atoms, an alkyl of 1–20 carbon atoms, halo groups such as chloro or bromo, also cyano, nitro, hydroxy, and alkoxy, the alkyl moiety of which contains up to 18 carbon atoms, aroxy such as phenoxy, arylsulfonyl such as phenylsulfonyl, aryl such as phenyl or naphthyl, aralkyl such as benzyl or phenylethyl, also heterocyclic groups, and amino groups, which, in turn, may be further substituted with an alkyl having up to 18 carbon atoms, an aryl, preferably phenyl, or an acyl group, preferably an acyl derived from aliphatic mono- or dicarboxylic acids having 2–20 carbon atoms, or benzoyl, when desired.

For the purpose of the present invention at least one of $R_1$, $R_2$, $R_3$ and $R_4$, however, must be further substituted by a member such as an alkyl of 6–20 carbon atoms, an alkoxy of 6–20 carbon atoms or an alkyl amino having an alkyl group containing up to 20 carbon atoms when $R_2$ in the above formula is defined other than alkyl group having 6–20 carbon atoms.

Compounds having the formula $$R_1'-C=N-NH-R_3'$$
$$R_2'-C=N-NH-R_4'$$

are found particularly useful when incorporated in silver halide emulsion layers. In the above formula, $R_1'$ and $R_2'$ may include hydrogen and alkyls of 6–20 carbon atoms, also a phenyl, naphthyl, benzyl and also heterocyclic members, as defined in $R_1$ and $R_2$ (supra).

$R_1'$ and $R_2'$ may also be combined as a 5–6 membered ring inclusive of an isocyclic or heterocyclic moiety as in $R_1$ and $R_2$, provided at least one of $R_3'$ and $R_4'$ incorporates an alkyl or alkoxy substituent of 6–20 carbon atoms; $R_3'$ and $R_4'$ include aromatic groups particularly substituted aryl groups having substituents such as sulfo, sulfonamido, carboxyl, carbamoyl, esterified carboxyl such as alkyl esters, having up to 20 carbon atoms in the alkyl groups, halo, cyano, nitro, hydroxy, alkoxy, phenoxy, phenyl sulfonyl, aryl, aralkyl, amino, and alkyl substituted amino aryls. Also included are aryl substituted amino aryls, sulfomethyl-aryls, alkyl aryls having alkyl groups containing up to 20 carbon atoms and a heterocyclic group as defined in $R_3$ and $R_4$.

A further useful sub-group of compounds within the present invention is represented by the following formula $$HC=N-NH-R_3''$$
$$R_2''-C=N-NH-R_4''$$

wherein $R_2''$ is defined as an alkyl of 10–20 carbon atoms and N-phenyl alkyl carbamyl; the $R_2''$ group is also defined together with the

—C—CH
‖ ‖ moiety as a benzofurane, indolyl or

H₂  CH₃  CH₃
‖    |    |
O=〈    〉=H₂
    C—C
    ‖ ‖ moiety; $R_3''$ and $R_4''$ usefully include sulfo-aryl, sulfoalkoxy-aryl, sulfo-phenylsulfonyl-aryl, disulfo-aryl, sulfoamino-aryl, carboxynitro-aryl, phenoxy-sulfo-aryl, halo-lower alkyl-sulfo-aryl, phenoxy-sulfo-aryl, nitro-sulfo-aryl, phenylamino-sulfo aryl, sulfomethyl-aryl, sulfophenylazo-aryl, disulfo-alkyl-aryl

[structure with alk-N, benzothiazole linked to phenyl with —SO₃H, and —C linked to benzothiazole]

wherein alk is an alkyl, at least one of $R_3''$ and $R_4''$ containing an alkyl substituent of 6–20 carbon atoms where $$R_2-C-CH$$
‖ ‖ is defined in combination as a ringed member.

The compounds, as above described, may be obtained, for instance, by reacting a 1,2-dicarbonyl compound with a hydrazine to form the corresponding dihydrazone, hereinafter referred to simply as an osazone. Depending on whether (a) a monohydrazone is prepared by reacting one mol of dicarbonyl compound with one mol of a hydrazine and then reacting with a second mol of a hydrazine, or (b) one mol of dicarbonyl compound is directly reacted with two mols of a hydrazine, it is possible to obtain osazones corresponding to the above general formulae with different or identical hydrazine radicals. It is also possible to obtain the osazones by producing the monoxime of the dicarbonyl compound and reacting this oxime with a hydrazine to produce an oximehydrazone, and thereafter reacting this with a second mol of another hydrazine while splitting off hydroxylamine.

Furthermore, α-oxycarbonyl compounds such as α-oxyaldehydes or α-oxyketones can be reacted with excess hydrazine derivative to form hydrazones in known manner, or starting from the hydrazones of the α-oxycarbonyl compounds, mixed osazones can be obtained with excess hydrazine. It is often advisable to use the α-halogenocarbonyl compounds instead of the α-oxycarbonyl compounds. Carbonyl compounds having a methylene group adjacent to the carbonyl group can also be coupled with a diazonium salt to form the monohydrazone of the corresponding diketone according to the equations:

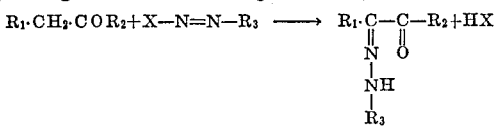

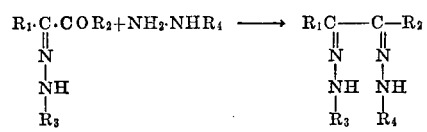

It is often advisable to activate the coupling capacity in the α-methylene carbonyl compounds by substituting with negative groups. Such groups are, for example, alkylcarbonyl and phenylcarbonyl radicals (—COOR) in which R is alkyl or phenyl cyano and halogen. In the case of the cyano and the alkoxycarbonyl radicals (—COOR) these groups can easily be split off again, so that, for example, when alkyl-carbonylacetic acid derivatives are used in accordance with the following equation:

$$R_1 \cdot CO \cdot CH_2 \cdot COOH + X—N=N—R_3 \rightarrow CO_2 +$$

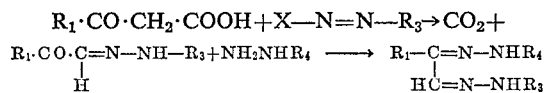

osazones are obtained in more convenient manner than by the reaction in stages of the corresponding carbonyl compounds with two different hydrazines.

By reaction of the osazones of α-ketoaldehydes with diazonium compounds, it is possible in accordance with the following equation:

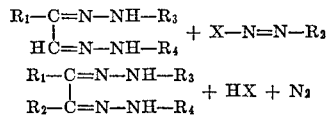

to obtain osazones of diketones. This method is of interest for the production of osazones of heterocyclic aromatic α-diketones. The dicarbonyl compounds

themselves are also readily obtainable to known methods.

The following examples are intended to illustrate more fully the preparation of dihydrazones of the type found useful in the present invention, but are not to be construed as a limitation upon the scope thereof.

Example 1

(a) 17 g. of p-sulphanilic acid are dissolved in 100 cc. of 2 N-sodium hydroxide solution and 60 cc. of water, 7 g. of sodium nitrite are added, and the solution is introduced at 0° C. into a mixture of 30 cc. of concentrated hydrochloric acid and 30 cc. of water. Stirring is continued for 15 minutes, the pH value is adjusted to between 5 and 6 with about 15 g. of sodium acetate, and a mixture is poured into the solution of 36 g. of stearolylacetic acid ethyl ester and 30 g. of sodium acetate in 600 cc. of methanol. Stirring is continued for another 30 minutes, the precipitate is filtered by suction, washed with dilute methanol and dried in vacuo at room temperature. Yield: 50 g. of α-(p-sulphoazobenzene)-stearoyl acetic acid ethyl ester (Formula I hereinafter).

(b) 30 g. of this compound are introduced into a solution of 30 g. of sodium hydroxide in 500 cc. of water and heated to 60° C., whereupon it dissolves. The mixture is boiled for another 20 minutes and the still hot solution is neutralized with glacial acetic acid. 23 g. of 4-methoxy-3-sulphophenyl hydrazine are then added, boiled under reflux for 10 minutes and the still hot mixture is introduced into 1 liter of saturated sodium chloride solution, filtered by suction after standing and dried.

Yield: 40 g. of the compound represented by Formula III hereinafter.

8 g. of the osazone of the compound having Formula III are dissolved in 150 cc. of methanol and a quantity of 10% aqueous sodium hydroxide solution required to adjust the solution to a pH value of about 9 and incorporated into 1 kg. of a silver halide emulsion prepared in the usual way. A photographic layer produced with this emulsion mixture is exposed and developed for 5 minutes in a color developer having the composition:

|  | G. |
|---|---|
| Sodium hexaphosphate | 1.0 |
| p-Diethylamino aniline sulphate | 2.0 |
| Anhydrous sodium sulphite | 2.0 |
| Potassium bromide | 1.0 |
| Potassium carbonate | 75.0 |
| Water to make 1 liter of solution. | | bleached with a bleaching bath consisting of 200 g. of potassium ferricyanide in 1 liter of aqueous solution and fixed in the usual way.

A positive yellow dyestuff image is obtained.

Example 2

The compound represented by Formula II hereinafter is prepared as described in Example 1 by replacing the sulfanilic acid in stage (a) with 4 - amino - anisidine - 2 - sulfonic acid, and the 4 - methoxy - 3 - sulphophenyl hydrazine in stage (b) with 4 - sulfophenyl hydrazine.

The coupler of Formula II can be used, as described in Example 1, for the production of a positive yellow dyestuff image.

Example 3

The compound represented by Formula IV is prepared as described in Example 1 by replacing the sulfanilic acid of stage (a) with 4 - amino - diphenylamine - 2- sulfonic acid and the 4 - methoxy - 3 - sulfophenyl - hydrazine in stage (b) with 2 - chloro - 5 - sulfophenyl hydrazine.

The compound of Formula IV produces a magenta dyestuff image after treatment as described in Example 1. The magenta dyestuff has a maximum absorption band at 535 millimicrons.

Example 4

(a) 4 - isododecylchloroacetophenone.—35 g. of AlCl₃ are introduced over a period of 30 minutes into a solution of 62 g. of isododecyl benzene and 32 g. of chloroacetyl chloride in 100 cc. of carbon disulphide. The mixture is thereafter heated for 3 hours to its boiling point. The carbon disulphide is distilled off and the mixture is then introduced into 200 cc. of water, 200 g. of ice and 20 cc. of HCl. The precipitated oil is taken up in 100 cc. of methylene chloride, the solution is dried over CaCl₂ and the solvent distilled off. The residue is distilled in vacuo, whereby a shortest possible distillation time is maintained.

B.P.: 0.6 mm. from 180° C. Yield: 40 g.

(b) 6.4 g. of the foregoing compound, 7 g. of sodium acetate and 100 cc. of methanol are heated for 3 hours to its boiling point. 12 g. of 4 - sulphophenyl - hydrazine and 40 cc. of $H_2O$ are then added and boiling is continued for another 1½ hours. The mixture is thereafter introduced into 250 cc. of saturated sodium chloride solution, left to stand for 4 hours, filtered by suction and dried in vacuo. Yield: 7 g. of the compound represented by Formula V.

When used as described in Example 1, this compound yields a positive yellow dyestuff image.

Example 5

(a) 10.9 g. of 4 - ethoxyaniline - 3 - sulphonic acid were diazotized by the usual method. After destroying the excess nitrite, the diazonium salt solution is adjusted to a pH value of 6 by adding solid sodium acetate. This solution is slowly added with stirring to a solution of 20 g. of stearoylacetic acid ester in 250 cc. of methanol heated to 28° C., stirred for 10 minutes at 28° C., and then cooled and filtered by suction to remove the excess stearoylacetic acid ester. This product is recrystallized from acetone and dried. The dry product is slowly heated to 60° C. with 100 cc. of 2 N NaOH while stirring, kept for 20 minutes at this temperature and then briefly boiled, cooled, filtered with suction, introduced into 10% acetic acid, filtered by suction, stirred while cold with acetone, filtered by suction and dried.

(b) 5.1 g. of the foregoing product, 50 cc. of water, 70 cc. of 10% sodium acetate solution and 3.9 g. of 5-sulfo - 2 - hydrazine - 4' - hydroxy - 3' - carboxydiphenyl sulphone are heated in 40 minutes to 60° C. while stirring, cooled, adjusted to a pH value of 8.3 by dropwise addition of dilute NaOH, whereupon it initially becomes jelly-like and, with further stirring, it solidifies to a precipitate which can be satisfactorily exhausted.

This product has the composition represented by Formula VI. When used as described in Example 1, a positive yellow dyestuff image is obtained.

Example 6

5.1 g. of the product prepared as described in Example 5(a) were heated for 40 minutes to 60° C. with 50 cc. of water, 50 cc. of 10% sodium acetate solution and 3.7 g. of 5 - acetamino - 2 - hydrazino - 4' - hydroxy - 3'-carboxy diphenyl sulphone, adjusted to a pH value of 8 by adding dilute NaOH, cooled and precipitated by adding 500 cc. of 25% sodium chloride solution.

The project is represented by Formula VII.

When used as described in Example 1, a deep red-orange colored positive dyestuff image is obtained.

Example 7

4.6 g. of 4 - octadecoxy - phenyl - hydrazine - 3 - sulphonic acid, 50 cc. of 10% sodium acetate solution, 2 cc. of glacial acetic acid and 0.6 cc. of 50% glyoxal are heated for 1 hour to 45–48° C. while stirring. A red precipitate is formed, which is filtered with suction after cooling and then dried.

Yield: 4.5 g. of the compound represented by Formula VIII.

When used as described in Example 1, a positive reddish-brown dyestuff is obtained.

Example 8

9.2 g. of 4 - octadecoxy - phenyl - hydrazine - 3 - sulfonic acid, 100 cc. of 10% sodium acetate solution, 1.2 g. of 3 - phenyl - propane - 2,3 - dione are heated for 2 hours at 60 to 65° C. while stirring, cooled, filtered with suction and dried. Yield: 10.1 g. of the compound represented by Formula IX.

When used as described in Example 1, a positive yellow dyestuff image is obtained.

Example 9

9.2 g. of 4 - octadecoxy - phenyl - hydrazine - 3 - sulfonic acid, 100 cc. of 10% sodium acetate solution, 4 cc. of glacial acetic acid and 1.5 g. of cumarane - 2,3 - dione-2,3 - dihydrobenzofuran - 2,3 - dione are heated for 2 hours to 60 to 65° C. while stirring, cooled, filtered with suction and dried. Yield: 7.8 g. of the compound represented by Formula X.

The osazone thus obtained is used and processed as described in Example 1. After fixing, it is washed for another 10 minutes in a 2 N acetic acid solution. A yellow positive dyestuff image is obtained.

Example 10

(a) 8.7 g. of 4-aminobenzene sulphonic acid were diazotized by a conventional method, the excess of nitrite destroyed and the solution adjusted to a pH value of 6 by adding solid sodium acetate.

This solution was added at 0° C. to the solution of 7 g. of 1,1 - dimethyl - cyclohexane - 3,5 - dione which is also known as 5,5-dimethyl-1,3-cyclohexanedione, dimedone and methone in 75 cc. of methanol. With the addition, the solution immediately became yellow in color, and after standing overnight in a refrigerator, lemon-yellow crystals precipitated, which were filtered with suction and dried.

(b) 3.2 g. of the above compound (a), 9.2 g. of 4-octadecoxy-phenyl-hydrazine-3-sulphonic acid, 75 cc. of water and 2 N sodium hydroxide solution sufficient to produce a pH value of 5 are heated for 2 hours on a boiling water bath while stirring; after cooling, 2 N sodium hydroxide solution is added until the pH value is 8 and the reaction product is precipitated by adding 250 cc. of saturated potassium chloride solution. The compound has the composition represented by Formula XI. When used as described in Example 1, a positive brown dyestuff image is obtained.

Example 11

Four (4) grams of 2-acetylcumarone (2-acetylbenzofuran) are converted as described by W. Reid and K. Sommer in Annalen, vol. 611, page 114 (1958), into cumaryl-(2)-glyoxal (2-glyoxyloylbenzofuran) by oxidation with selenium dioxide. The glyoxyloylbenzofuran thus obtained is heated for half an hour to 60 to 65° C. with 50 cc. of dimethyl formamide, 20 cc. of 2 N sodium acetate solution and 11.4 g. of 4-octadecoxy-phenyl-hydrazine-3-sulphonic acid while stirring on a water bath, whereupon 6.6 g. of 73% phenyl hydrazine-4-sulphonic acid are added, and the reaction mixture is kept for another half an hour at the temperature indicated. After cooling, 50 cc. of water are added to the solution and precipitation is caused by sodium chloride solution. The precipitate is filtered with suction and dried. The compound has the composition represented by Formula XII. When used as described in Example 1, a positive yellow image is formed.

Example 12

Reaction product of 2-glyoxyloylbenzofuran 4 g. of 2-acetylbenzofuran is oxidized as described in the preceding example to form coumaryl-2-glyoxal. After distilling off the dioxane, the residue has added thereto 50 cc. of dimethyl formamide, 20 cc. of 2 N sodium acetate solution and 9.2 g. of 4-dodecoxy-phenyl hydrazine-3-sulphonic acid, and the mixture is heated while stirring to 60 to 65° C., whereupon 9.6 g. of 2 - hydrazino-4-sulpho-3'-carboxy-4'-hydroxy-diphenyl sulphone are added, heating is continued for another half an hour at 75° C., the mixture is cooled and introduced into 25% sodium chloride solution; the product precipitates in greasy form and becomes solid on stirring with sodium chloride solution. It is then filtered with suction and dried.

The compound has the composition represented by

Formula VIII and when used in accordance with Example 1, produces a yellow dyestuff image.

Example 13

The compound represented by Formula XIV is prepared by a method analogous to that described in Examples 1 to 3. A light-sensitive material coated upon a transparent support prepared as described in Example 1(b) is developed with the color developer compound disclosed in Example 4 and after subsequent rinsing, it is (a) in one case bleach-fixed in a bleach-fixing bath, as described in Example 5 of German Patent No. 866,605, and (b) in another case, it is treated in a bleaching bath consisting of 100 g. of potassium ferricyanide and 10 g. of sodium carbonate in 1000 cc. of water and fixed in the usual way.

After treatment referred to as (a), a slightly yellowish colored positive image is obtained with a color density of 0.3 measured behind a Schott filter BG 12/2 mm. The treatment referred to as (b) a yellow positive color image is obtained having a maximum color density of 1.65 when measured behind the same filter.

Example 14

(a) 4.5 g. of 4-amino - N - methyl-N-stearyl-aniline-2-sulphonic acid are formed into a paste with 40 cc. of methanol and dissolved in 30 cc. of water and 11 cc. of 2 N sodium hydroxide solution at about 50° C. 0.7 g. of sodium nitrite is then added and the still warm solution is so introduced into 30 cc. of ice-cooled 2 N hydrochloric acid that the temperature rises to about 20° C. while the introduction is being carried out. Stirring is continued for 1 hour, the precipitated diazonium salt is filtered off with suction and, while still moist, it is formed into a paste with 60 cc. of methanol.

The suspension of the diazonium salt prepared in this way is introduced at room temperature into a solution of 1.5 g. of α-methyl acetoacetic ester in 60 cc. of methanol and 30 cc. of 2 N sodium hydroxide solution, which had been standing for 24 hours at room temperature. The compound immediately precipitates, is filtered with suction after 30 minutes, triturated with acetone, and then filtered with suction. Yield: 5 g.

(b) 5.4 g. of the compound (a) are dissolved with 1.1 g. of phenyl hydrazine and 5 g. of sodium acetate by brief heating and then left to stand overnight. The solution is formed into a paste with 150 cc. of saturated sodium chloride solution and 100 cc. of water, filtered with suction and dried in vacuo at room temperature.

Yield: 5 g. of the compound according to Formula XV.

Example 15

5.1 g of the product prepared according to Example 5(a) are heated with 75 cc. of 2 N sodium acetate solution and 3.5 g. of 4-sulpho-2-hydrazine-4'-methyldiphenyl sulphone for half an hour at 80° C.; it is thereafter adjusted to a pH value of 8, cooled and filtered with suction (Formula XVI).

8 g. of the compound (Formula XVI) were used to prepare, as described, in Example 1, in a photographic material, which is developed in a developer with the following composition:

| | |
|---|---|
| Sodium hexaphosphate _____ g__ | 1.0 |
| 1 - phenyl - 4 - aminopyrazolone - 3 - carboxylic acid amide _____ g__ | 5.0 |
| Anhydrous sodium sulphite _____ g__ | 2.0 |
| Potassium bromide _____ g__ | 1.0 |
| Anhydrous potassium carbonate _____ g__ | 75.0 |
| Water _____ l__ | 1 |

After bleaching and fixing as described in Example 1, a positive yellow dyestuff image is obtained.

Example 16

4 g. of 2-acetylbenzofuran are oxidized as described in Example 11 to form 2-glyoxylbenzofuran. After distilling off the dioxane, there are added to the residue 50 cc. of dimethyl formamide, 20 cc. of 2 N sodium acetate solution and 11.4 g. of 4-octadecoxy-phenyl hydrazine-3-sulphonic acid and heated for half an hour while stirring to 60 to 65° C., and after this time there are added 6.2 g. of 4-acetaminophenyl-hydrazine-3-sulphonic acid, and the mixture is heated after 1 hour to 70° C., cooled, precipitated by adding 25% NaCl solution, filtered with suction and dried (Formula XVII).

8 g. of the compound (Formula XVII) are used to prepare as described in Example 4 in a photographic material. It is developed in a developer having the following composition:

| | |
|---|---|
| Sodium hexaphosphate _____ g__ | 1.0 |
| 2,6-dichloro-4-aminophenol _____ g__ | 5.0 |
| Anhydrous sodium sulphite _____ g__ | 2.0 |
| Potassium bromide _____ g__ | 1.0 |
| Anhydrous potassium carbonate _____ g__ | 75.0 |
| Water _____ l__ | 1 |

After bleaching and fixing as described in Example 1, a positive yellow dyestuff image is obtained.

Example 17

3.7 g. of 2-(4-hydrazinophenyl)-3-dodecyl-benzimidazole-6-sulphonic acid are dissolved while heating in 20 cc. of saturated aqueous sodium acetate solution and 20 cc. of propanol. After adding 0.32 g. of diacetyl, the mixture is heated for about 20 minutes to 70°, the cooled solution is diluted with 50 cc. of water and such a quantity of 30% acetic acid is added that the product precipitates. The supernatant liquid is decanted off, the residue is stirred with a small quantity of water, filtered with suction and dried.

Yield: 3.3 g.

The compound which is represented by Formula XVIII, gives a positive yellow image when incorporated into a silver halide emulsion and developed as described in Example 1.

Example 18

A solution of 11.2 g. of 2-(3-hydrazinophenyl)-3-octadecyl-benzimidazole-6-sulphonic acid and 9 g. of anhydrous sodium acetate in 40 cc. of propanol and 30 cc. of water is stirred for half an hour at 25–30° C. while adding 1.7 g. of diacetyl. 4.6 g. of 4-ethoxy-phenylhydrazine-3-sulphonic acid are then added and a solution is obtained by heating to 85° C. This temperature is maintained for half an hour, the dihydrazone starting to precipitate. The precipitation is completed by cooling and adding 60 cc. of 50% acetic acid, the supernatant solution is decanted and the residue is filtered with suction after stirring with acetone and then dried.

Yield: 9.8 g.

The product (Formula XIX) gives a positive yellow image after being cast in a silver halide emulsion and developed as described in Example 1.

Example 19

(a) 21 g. of 4-aminophenetol sulfonic acid (2) are diazotized in accordance with the method disclosed in Example 1. The resulting diazonium salt solution is adjusted to a pH value of about 6 by addition of sodium acetate and added at 0° C. to a solution of 19.4 g. of isonicotinoyl acetic acid ethyl ester and 16 g. of sodium acetate (anhydrous) in 200 cc. of methanol. Stirring is continued for another 30 mins. Thereafter 400 cc. of an aqueous 25% sodium chloride solution are added and the faintly yellow precipitate which forms is sucked off, dried and recrystallized from acetone.

Yield: 25 g., the compound corresponds to Formula XX.

(b) The above compound is dissolved in 200 cc. of 1 N sodium hydroxide solution, slowly heated to 60° C., and thereafter kept for 10 minutes at 90° C., cooled with ice-water and neutralized by addition of glacial acetic acid. The solution is concentrated by vacuum evaporation and the remaining semi-solid product is treated with warm acetone. After cooling, the solid product which has formed is sucked off. Its formula is represented by Formula XXI.

(c) 10 g. of the foregoing compound Formula XXI are mixed with 100 cc. of water, 140 cc. of an aqueous 10% sodium acetate solution and 0.1 g. of 4-octadecoxyphenyl-hydrazine-3-sulfonic acid (3-sulfo-4-octadecoxyphenyl-hydrazine). The resulting solution is kept whilst stirring for one hour at 60° C., thereafter cooled with ice-water. The precipitate which has formed is filtered off with suction and dried. The compound is represented by Formula XXII.

This compound is used as described in Example 1 to produce a silver halide emulsion which upon development forms a positive yellow dyestuff image.

Example 20

3 g. of isatin and 18.3 g. of 4-octadecoxyphenyl-hydrazine-3-sulfonic acid-3-sulfo-4-octadecoxyphenylhydrazine are mixed with 100 cc. of dimethylformamide and 20 cc. of 2 N aqueous sodium acetate solution. The mixture is heated for 1 hour whilst stirring at 60 to 65° C., thereafter filtered with suction and the filtrate has added thereto sodium chloride to precipitate a compound represented by Formula XXIII. The precipitate is filtered by suction, washed with water and dried in vacuo at room temperature.

The compound is used as described in Example 1 for the production of a positive yellow dyestuff image.

Example 21

The compound represented by Formula XXIV is obtained when in accordance with the method described in Example 1, by replacing in step (a) the sulfanilic acid by an equivalent amount of 4-nitroaniline-3-carbonic acid and in step (b) the 4-methoxy-3-sulfophenylhydrazine, by an equivalent amount of 4-ethoxy-3-sulfophenylhydrazine.

The compound of Formula XXIV as well as the compounds described in the following Examples (22 to 39) are used each formulated into silver halide emulsions which are then developed and produce images as described in Example 1.

Example 22

The compound of Formula XXV is obtained in accordance with the method described in Example 1, by replacing in step (a) the sulfanilic acid, by an equivalent amount of 2-ethoxynaphthyl amine-6-sulfonic acid and in step (b) the 4-methoxy-3-sulfophenylhydrazine, by an equivalent amount of 5-acetamino-2-hydrazino-benzene-sulfonic acid.

Example 23

The compound of Formula XXVI is obtained in accordance with the method described in Example 1, by replacing in step (a) the sulfanilic acid, by an equivalent amount of 2-ethoxynaphthylamine-6-sulfonic acid and in step (b) the 4-methoxy-3-sulfophenylhydrazine, by an equivalent amount of 4-hydrazino-1-phenoxybenzene-sulfonic acid-(2).

Example 24

The compound of Formula XXVII is obtained in accordance with the method described in Example 1, by replacing in step (a) the sulfanilic acid, by an equivalent amount of 2-amino-1-phenoxy-benzene - 5 - sulfonic acid and in step (b) the 4-methoxy-3-sulfophenylhydrazine is replaced by an equivalent amount of 5-(N-oxalyl-amino)-2-hydrazino-1-methyl-benzene-sulfonic acid-(4).

Example 25

The compound of Formula XXVIII is obtained in accordance with the method described in Example 1, by replacing in step (a) the sulfanilic acid, by an equivalent amount of 2-amino-3-chlorotoluene-sulfonic acid-(5) and in step (b) the 4-methoxy-3-sulfophenylhydrazine, by an equivalent amount of 4-hydrazino-1-phenoxy-benzene-sulfonic acid-(2).

Example 26

The compound of Formula XXIX is obtained in accordance with the method described in Example 1, by replacing in step (a) the sulfanilic acid, by an equivalent amount of 4-amino-1-phenoxy-benzene-sulfonic acid-(2) and in step (b) the 4-methoxy-3-sulfophenylhydrazine, by an equivalent amount of 4-hydrazino-1-phenoxy-benzene-sulfonic acid-(2).

Example 27

The compound of Formula XXX is obtained in accordance with the method described in Example 1, by replacing in step (a) the sulfanilic acid, by an equivalent amount of 4-amino-1-phenoxy-benzene-sulfonic acid-(3) and in step (b) the 4-methoxy-3-sulfophenylhydrazine, by an equivalent amount of phenylhydrazine-3-carbonic acid.

Example 28

The compound of Formula XXXI is obtained in accordance with the method described in Example 1, by replacing in step (a) the sulfanilic acid, by an equivalent amount of 4-amino-1-phenoxybenzene-sulfonic acid-(2) and in step (b) the 4-methoxy-3-sulfophenylhydrazine, by an equivalent amount of 4-ethoxyphenyl-hydrazine-sulfonic acid-(3).

Example 29

The compound of Formula XXXII is obtained in accordance with the method described in Example 1, by replacing in step (a) the sulfanilic acid, by an equivalent amount of 4-amino-1-phenoxybenzene-sulfonic acid-(2) and in step (b) the 4-methoxy-3-sulfophenylhydrazine, by an equivalent amount of 1-methyl-2-hydrazinobenzene-4,5-disulfonic acid.

Example 30

The compound of Formula XXXIII is obtained in accordance with the method described in Example 1, by replacing in step (a) the sulfanilic acid, by an equivalent amount of 2-ethoxy-naphthylamine-6-sulfonic acid and in step (b) the 4-methoxy-3-sulfophenylhydrazine, by an equivalent amount of phenylhydrazine-3-sulfonic acid.

Example 31

The compound of Formula XXXIV is obtained in accordance with the method described in Example 1, by replacing in step (a) the sulfanilic acid, by an equivalent amount of 2-ethoxynaphthylamin-6-sulfonic acid and in step (b) the 4-methoxy-3-sulfophenylhydrazine, by an equivalent amount of phenylhydrazine-3-carbonic acid.

Example 32

The compound of Formula XXV is obtained in accordance with the method described in Example 1, by replacing in step (a) the sulfanilic acid, by an equivalent amount of 2-nitraniline-4-sulfonic acid and in step (b) the 4-methoxy-3-sulfophenylhydrazine, by an equivalent amount of 4-ethoxy-phenylhydrazine-3-sulfonic acid.

Example 33

The compound of Formula XXXVI is obtained in accordance with the method described in Example 1, by replacing in step (a) the sulfanilic acid, by an equivalent amount of 3-nitraniline-4-sulfonic acid and in step (b) the 4-methoxy-3-sulfophenylhydrazine-3-sulfonic acid.

Example 34

The compound of Formula XXXVII is obtained in accordance with the method described in Example 1, by replacing in step (a) the sulfanilic acid, by an equivalent amount of 4-amino-1-phenoxy-2-sulfonic acid and in step (b) the 4-methoxy-3-sulfophenylhydrazine, by an equivalent amount of 5-oxalyl-amino-2-hydrazino-benzene-sulfonic acid-(1).

Example 35

The compound of Formula XXXVIII is obtained in accordance with the method described in Example 1, by replacing in step (a) the sulfanilic acid, by an equivalent amount of 4-amino-1-phenoxy-sulfonic acid-(2) and in step (b) the 4-methoxy-3-sulfophenylhydrazine, by an equivalent amount of phenyl-hydrazine-3-$\omega$-methane-sulfonic acid.

Example 36

The compound of Formula XXXIX is obtained in accordance with the method described in Example 1, by replacing in step (a) the sulfanilic acid, by an equivalent amount of 4-amino-1-phenoxy-benzene-sulfonic acid-(2) and in step (b) the 4-methoxy-3-sulfophenylhydrazine by an equivalent amount of phenyl-hydrazine-4-sulfonamide.

Example 37

The compound of Formula XL is obtained in accordance with the method described in Example 1 by replacing in step (a) the sulphanilic acid by an equivalent amount of 2-ethoxynaphthylamine-6-sulfonic acid and in step (b) the 4-methoxy-3-sulphophenyl-hydrazine, by an equivalent amount of 4-ethoxy-phenyl-hydrazine-3-sulphonic acid.

Example 38

The compound of Formula XLI is obtained in accordance with the method described in Example 1 by replacing in step (a) the sulphanilic acid, by an equivalent amount of 4-aminodiphenylamine-3-sulfonic acid and in step (b) the 4-methoxy-3-sulphophenylhydrazine, by an equivalent amount of benzthiazolylhydrazino-5-sulphonic acid.

Example 39

Arranged on a film support are (a) a red sensitive gelatin silver bromo-iodide emulsion layer having incorporated therein a diffusion-resistant cyan coupler, for example, 4-sulfo-1-naphthol-2-carboxylic acid from stearyl anilide, thereupon (b) a green sensitive gelatin silver bromo-iodide emulsion layer having incorporated therein a diffusion-resistant magenta coupler, for example, 1-(4'-sulphophenyl)-3-palmityl-pyrazolone-(5) thereupon (c) a green sensitive gelatin silver bromo-iodide emulsion containing per liter of emulsion 10 g. of the compound of Formula VI in the form of the sodium salt, thereupon (d) a yellow filter layer containing colloidal silver, thereupon (e) a blue sensitive gelatin silver bromo-iodide emulsion layer having incorporated therein a diffusion-resistant yellow coupler, for example, 4-stearylamido-benzoyl acetic acid-amido-isophthalic acid.

The photographically exposed multi-layer material is developed in a color developer having the following composition:

| | |
|---|---|
| 4-amino diethylaniline sulphate _____g__ | 2.50 |
| Anhydrous potassium carbonate _____g__ | 70.00 |
| Potassium bromide _____g__ | 2.00 |
| Anhydrous sodium sulphite _____g__ | 2.00 |
| Water _____l__ | 1 |

Development is followed by application of a bleaching bath consisting of a 20 percent aqueous solution of potassium ferricyanide and of a fixing bath consisting of a 10 percent aqueous solution of sodium thiosulfate.

The processed material contains negative yellow, magenta and cyan partial images in the image layers (a), (b) and a positive yellow image in the masking layer (c).

This image can be printed onto a multi-layer printing material to obtain positive color corrected multi-layer images.

I 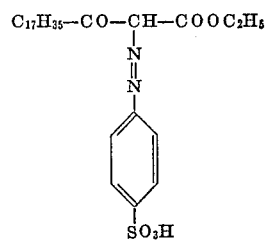

II 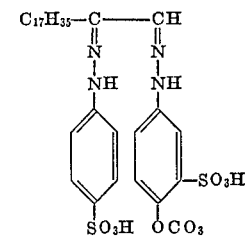

III 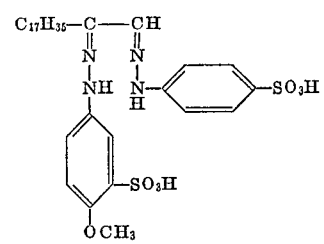

IV 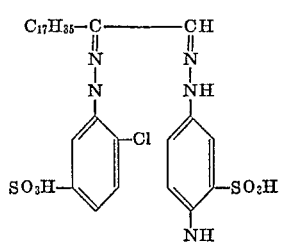

V 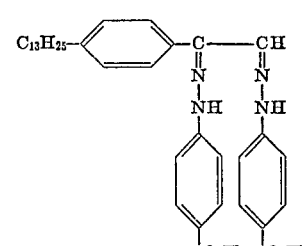

VI 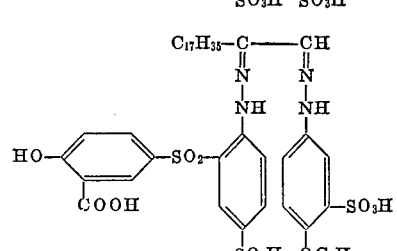

VII 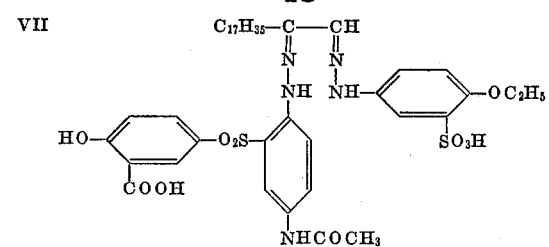
XIII 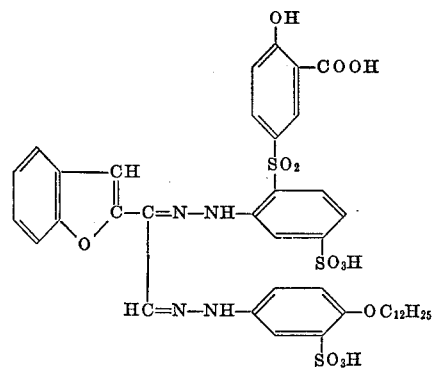
VIII 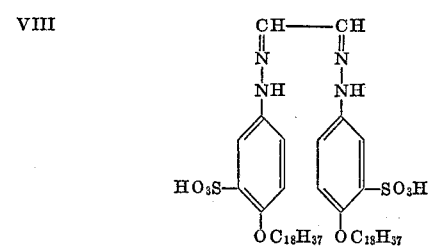
XIV 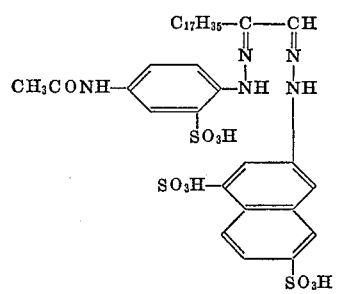
IX 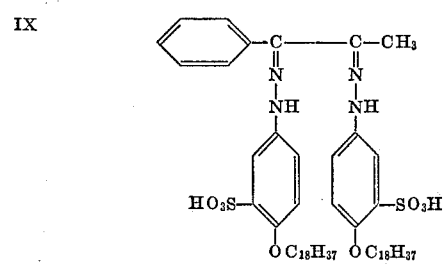
XV 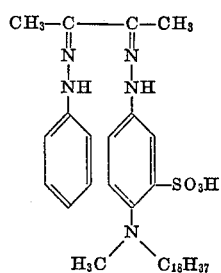
X 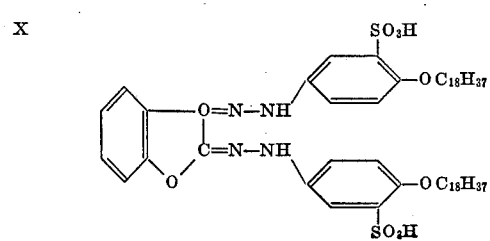
XVI 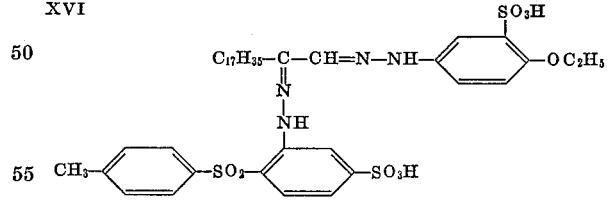
XI 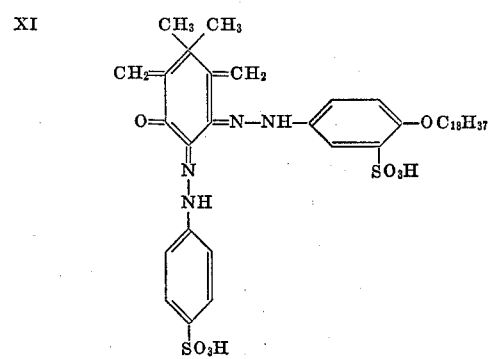
XVII 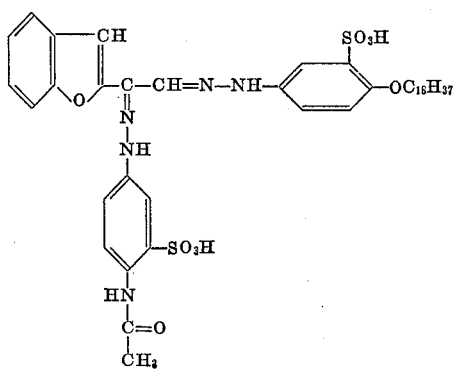
XII 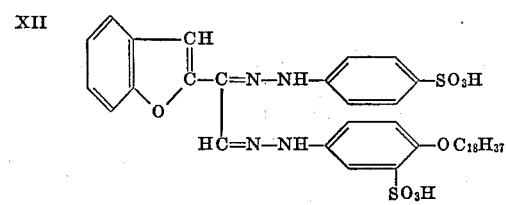

XVIII 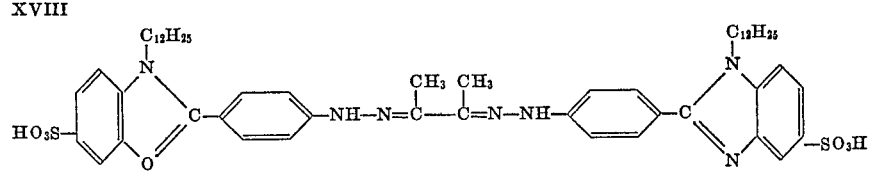
XIX 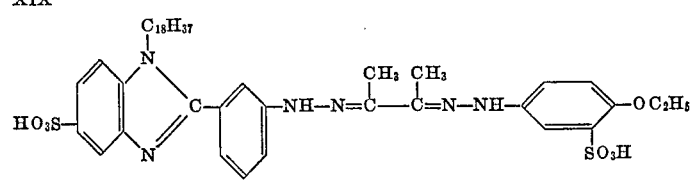
XX 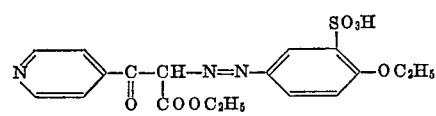
XXI 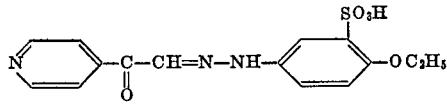
XXII 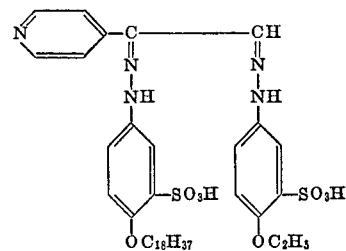
XXIII 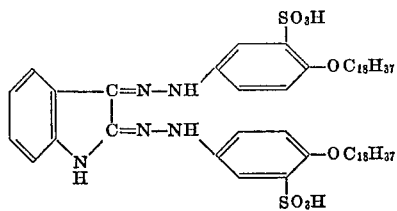
XXIV 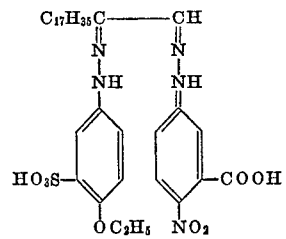
XXV 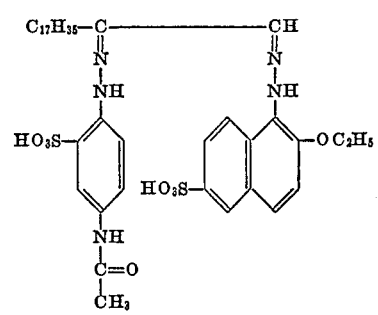
XXVI 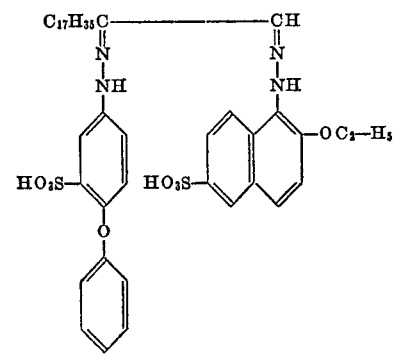
XXVII 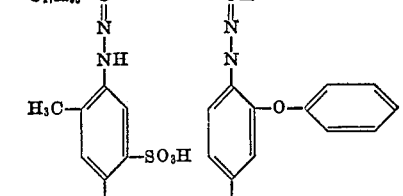
XXVIII 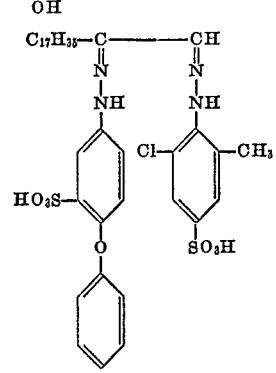
XXIX 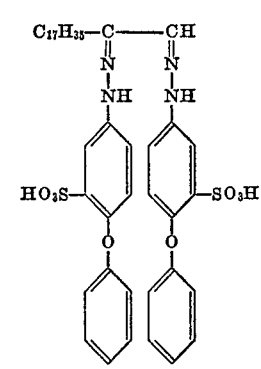

XXX 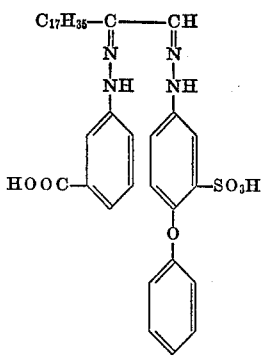
XXXVI 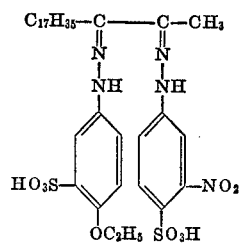
XXXI 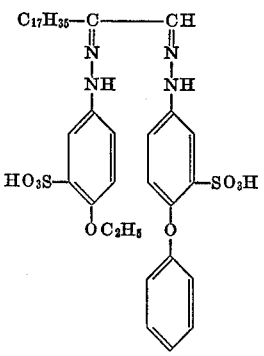
XXXVII 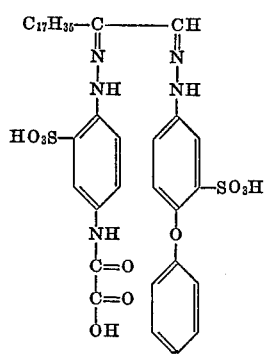
XXXII 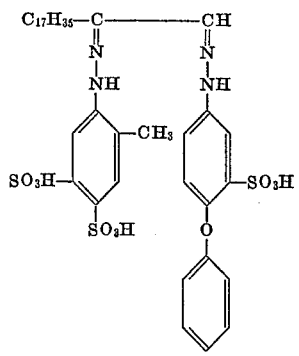
XXXVIII 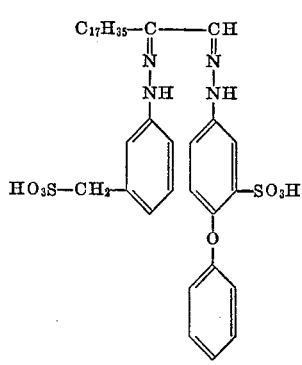
XXXIII 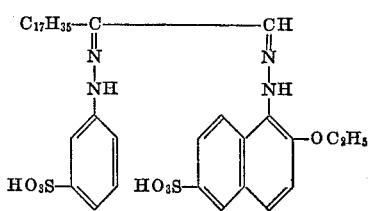
XXXIX 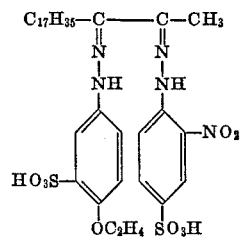
XXXIV 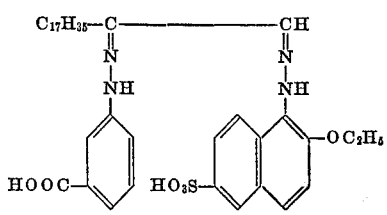
XL 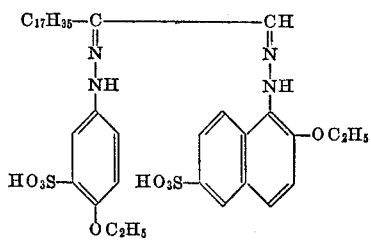
XXXV XLI 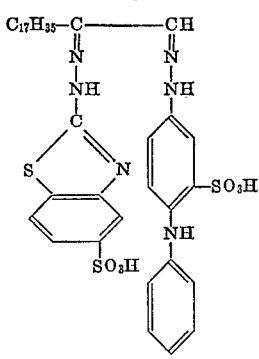

What is claimed is:

1. A compound of the formula $$R_1-C=N-NH-R_3$$
$$R_2-C=N-NH-R_4$$

wherein $R_1$ and $R_2$ are defined as a hydrogen, alkyl having up to 20 carbon atoms, phenyl, naphthyl, benzyl and heterocyclic radicals selected from the group consisting of furyl, thienyl coumaronyl, thionaphthenyl and pyridyl, $R_1$ and $R_2$ together with the connecting carbon atoms being further defined as a 5–6 membered ring comprising cyclopentanedione, cyclohexanedione, benzofurane and indolyl moiety; $R_3$ and $R_4$ are members selected from the group consisting of a phenyl, naphthyl, pyridyl, benzthiazolyl, thiazolyl, oxazolyl, benzimidazolyl, pyrazolyl and thienyl; $R_1$, $R_2$, $R_3$ or $R_4$ containing a substituent radical selected from the group consisting of alkyl of 6–20 carbon atoms, alkoxy of 6–20 carbon atoms, and alkyl amino having an alkyl group containing up to 20 carbon atoms when $R_2$ is defined other than alkyl having 6–20 carbon atoms.

2. A compound of the formula $$R_1-C=N-NH-R_3$$
$$R_2-C=N-NH-R_4$$

wherein $R_1$ and $R_2$ are individually defined as members selected from the group consisting of hydrogen, alkyl of 1–20 carbon atoms, phenyl, naphthyl, alkyl phenyl, furyl, thienyl, 2-benzofuranyl, benzothienyl and pyridyl; $R_1$ and $R_2$ together with the connecting carbon atoms being further defined as a 5–6 membered ring comprising cyclopentanedione, cyclohexanedione, benzofurane and indolyl moiety; $R_3$ is defined as naphthyl or phenyl radicals substituted by members selected from the group consisting of sulfonic acid, alkoxy, N-phenylamino, carboxy-hydroxy phenyl sulfonyl, dialkylamino, 3-alkyl-benzimidazole-6-sulfonic acid, nitro, carboxy, phenoxy, chloro, methyl and phenylamino; and $R_4$ is naphthyl, phenyl or substituted naphthyl or phenyl radicals having, as substituent groups, members selected from the group consisting of sulfonic acid, alkoxy, chloro, carboxy-hydroxyphenyl sulfonyl, acetamido, methylphenylsulfonyl, 3-alkyl-benzimidazole-6-sulfonic acid, phenoxy, N-oxalylamino, carboxy, methyl, methyl sulfonic acid, sulfamino, and benzthiazoyl-hydrazino-5-sulfonic acid.

3. A compound as defined in claim 1, wherein at least one of $R_3$ and $R_4$ contain a sulfo substituent.

4. A compound of the formula

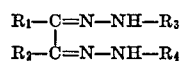

5. A compound of the formula

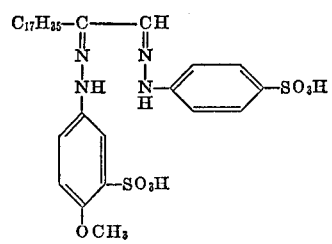

6. A compound of the formula

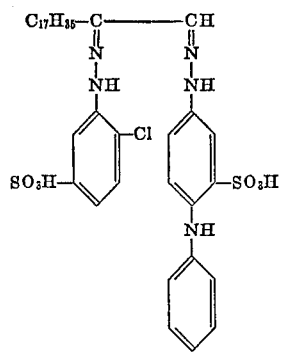

7. A compound of the formula

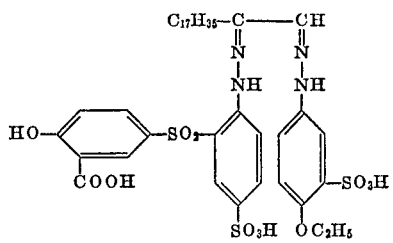

8. A compound of the formula

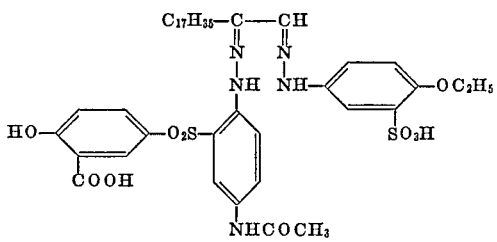

9. A compound of the formula

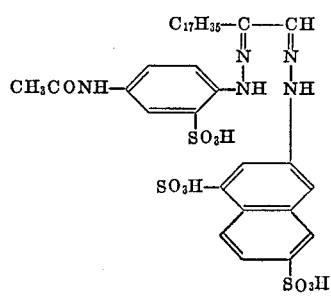

10. A compound of the formula
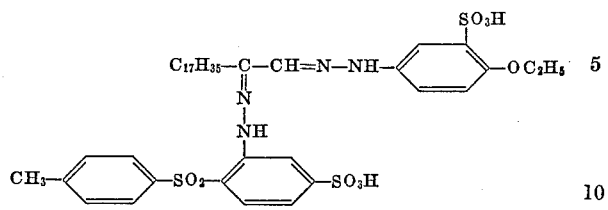
11. A compound of the formula
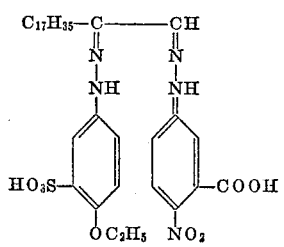
12. A compound of the formula
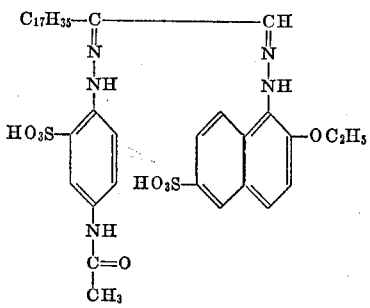
References Cited
UNITED STATES PATENTS
3,162,643   12/1964   Schellenberger et al. __ 260—305
OTHER REFERENCES
Henseke et al., Chem. Ber. vol. 88, pp. 1170 to 1177 (1955) QD 1D4.
JOHN D. RANDOLPH, *Primary Examiner.*

UNITED STATES PATENT OFFICE
CERTIFICATE OF CORRECTION

Patent No. 3,378,554                                          April 16, 1968

Walter Puschel et al.

It is certified that error appears in the above identified patent and that said Letters Patent are hereby corrected as shown below:

Column 3, line 45, the equation should appear as shown below $$R_1 \cdot CO \cdot CH_2 COOH + X-N=N-R_3 \rightarrow CO_2 + HX +$$

Column 6, line 5, "2,3-dihydrobenzofuran-2,3-dione are heated for 2" should read -- (dihydrobenzofuran-2,3-dione) are heated for 2 --; line 61, cancel "Reaction product of 2-glyoxyloyl-benzofuran". Column 9, lines 24 and 25, "hydrazine-3-sulfonic acid-3-sulfo-4-octadecoxyphenylhydrazine are mixed with 100 cc. of dimethylformamide and" should read -- hydrazine-3-sulfonic acid (3-sulfo-4-octadecoxyphenylhydrazine) are mixed with 100 cc. of dimethylformamide and --. Column 11, line 49, "boxylic acid from stearyl anilide, thereupon" should read -- boxylic acid stearylamide thereupon --. Column 12, lines 20 to 25, the formula should appear as shown below:

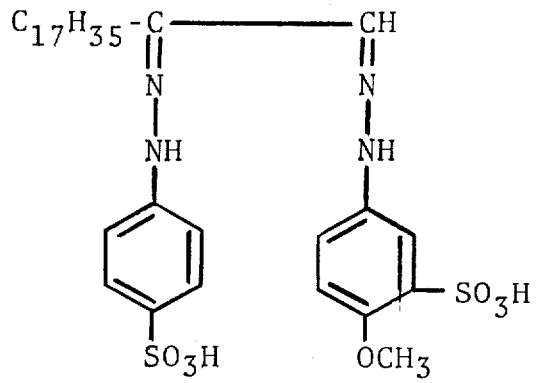

same column 12, lines 55 to 64, the upper left-hand portion of the formula should appear as shown below:

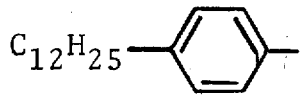

Column 13, lines 40 to 45, the left-hand portion of the formula should appear as shown below:

(2)
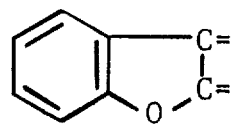
same column 13, lines 50 to 65, the formula should appear as shown below:
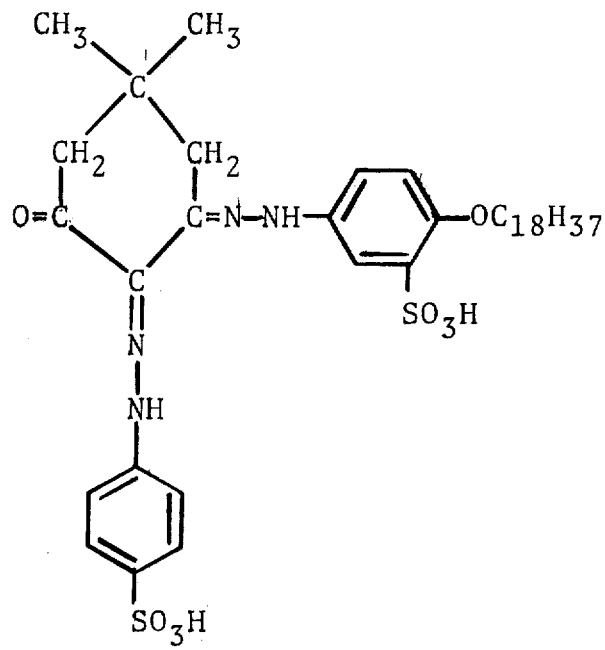
Column 15, first compound, replace the oxygen atom (O) in the left-hand rings with a nitrogen atom -- N --. Column 16, lines 32 to 45, the formula should appear as shown below:

(3)

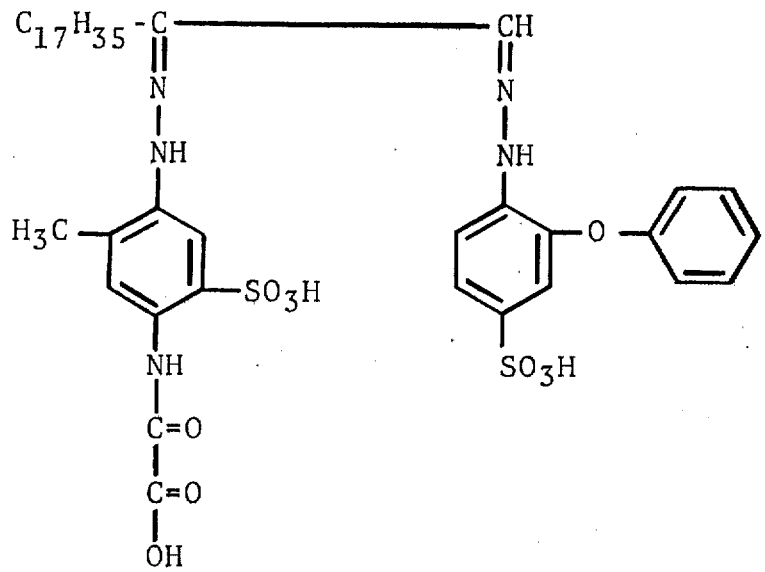

Column 17, lines 65 to 75, the lower left-hand portion of the formula should appear as shown below:

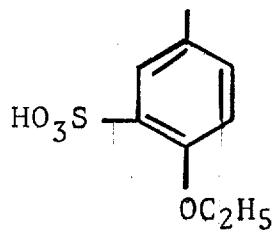

Signed and sealed this 3rd day of March 1970.

(SEAL)
Attest:

EDWARD M. FLETCHER, JR.
Attesting Officer

WILLIAM E. SCHUYLER, JR.
Commissioner of Patents